(12) United States Patent
Hiscock et al.

(10) Patent No.: US 11,003,593 B2
(45) Date of Patent: May 11, 2021

(54) METHOD FOR MANAGING A CACHE MEMORY OF AN ELECTRONIC PROCESSOR

(71) Applicant: Commissariat a l'Energie Atomique et aux Energies Alternatives, Paris (FR)

(72) Inventors: Thomas Hiscock, Grenoble (FR); Mustapha El Majihi, Grenoble (FR); Olivier Savry, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/744,268

(22) Filed: Jan. 16, 2020

(65) Prior Publication Data

US 2020/0257637 A1 Aug. 13, 2020

(30) Foreign Application Priority Data

Feb. 11, 2019 (FR) ...................................... 19 01312

(51) Int. Cl.
*G06F 12/00* (2006.01)
*G06F 12/128* (2016.01)
(Continued)

(52) U.S. Cl.
CPC ........ *G06F 12/128* (2013.01); *G06F 12/0897* (2013.01); *G06F 12/1009* (2013.01);
(Continued)

(58) Field of Classification Search
CPC .................................................... G06F 12/128
(Continued)

(56) References Cited

U.S. PATENT DOCUMENTS 5,133,061 A 7/1992 Melton et al.
5,797,022 A * 8/1998 Shimotono ............... G06F 1/32
713/323
(Continued)

FOREIGN PATENT DOCUMENTS

JP 2012-23618 A 2/2012

OTHER PUBLICATIONS

French Preliminary Search Report dated Oct. 15, 2019 in French Application 19 01312 filed Feb. 11, 2019 (with English Translation of Categories of Cited Documents & Written Opinion), 13 pages.
(Continued)

*Primary Examiner* — Jae U Yu
(74) *Attorney, Agent, or Firm* — Oblon, McClelland, Maier & Neustadt, L.L.P.

(57) ABSTRACT

A method for managing a cache memory, including executing first and second processes, when the second process modifies the state of the cache memory, updating the value of an indicator associated with this second process, and comparing the value of this indicator to a predefined threshold and, when this predefined threshold is exceeded, detecting an abnormal use of the cache memory by the second process, in response to this detection, modifying pre-recorded relationships in order to associate with the identifier of the second process a value of a parameter q different from the value of the parameter q associated with the first process so that, after this modification, when the received address of a word to be read is the same for the first and second processes, then the set addresses used to read this word from the cache memory are different.

15 Claims, 4 Drawing Sheets

(51) Int. Cl.
  *G06F 12/0897* (2016.01)
  *G06F 12/1009* (2016.01)
(52) U.S. Cl.
  CPC ............... *G06F 2212/225* (2013.01); *G06F 2212/6012* (2013.01); *G06F 2212/657* (2013.01)
(58) Field of Classification Search
  USPC .......................................................... 711/133
  See application file for complete search history.

(56) References Cited

U.S. PATENT DOCUMENTS

2002/0087925 A1* 7/2002 Hayden ............... G06F 13/1663
                                                                                  714/718
2009/0063825 A1* 3/2009 McMillen ............. G06F 9/4498
                                                                                  712/220
2012/0297110 A1   11/2012 Kavi
2016/0170889 A1   6/2016 Lee et al.
2018/0046808 A1   2/2018 Cammarota et al.

OTHER PUBLICATIONS

Wang, Z. et al., "New Cache Designs for Thwarting Software Cache-based Side Channel Attacks," ACM Sigarch Computer Architecture News, ACM Special Interest Group on Computer Architecture, vol. 35, No. 2, Jun. 9, 2007, pp. 494-505, XP058224816.

Liu, F. et al., "Random Fill Cache Architecture," 2014 47th Annual IEEE/ACM International Symposium on Microarchitecture, 2014, pp. 203-215.

Gonzalez, A. et al., "Eliminating Cache Conflict Misses Through XOR-Based Placement Functions," ICS 1997: Proceedings of the 11th International Conference on Supercomputing, Jul. 1997, 11 pages.

* cited by examiner

METHOD FOR MANAGING A CACHE MEMORY OF AN ELECTRONIC PROCESSOR

The invention relates to a method and unit for managing a cache memory of an electronic processor.

Cache memories are used so that a process executed by a microprocessor can access more rapidly information initially stored in the main memory.

In this patent application, by "process", what is meant is either a program or a routine of this program or any other software executed by the microprocessor and liable to read or write to the read memory.

The state of the cache memory is highly dependent on the addresses that have been accessed by the one or more processes executed by the microprocessor. Moreover, the state of the cache memory at a given time may be quite easily observed by another process executed by the microprocessor, notably by measuring the time taken to access the cache memory.

These characteristics of a cache memory have been exploited to develop what are known as side-channel attacks. These attacks allow secret information processed by an executed process to be revealed or the operation of the executed process to be modified in order to bypass security measures. For example, the secret information is a cryptography key used to encrypt or decrypt information. A security measure is, for example, the input of a PIN code.

To this end, a process performing a side-channel attack through a cache memory observes the state of the cache memory while the attacked process is being executed in order to determine the one or more addresses accessed by this attacked process. The addresses accessed often depend on secret data processed by the attacked process. Thus, knowing the addresses accessed by the attacked process allow complete or partial information on the secret data to be obtained.

In general, these attacks assume the execution of a malicious process in parallel to the attacked process. This malicious process must have access to precise addresses of the cache memory.

To increase the robustness of the cache memory with respect to these attacks, it has already been proposed to partition the cache memory into a plurality of separate partitions each associated with one respective process. The partition associated with one particular process is then solely accessible by this process and cannot be read from or written to by the other processes executed in parallel by the electronic processor. Thus, a malicious process cannot access the partition of another process and therefore cannot obtain information on the operation of this other process. Thus, partitioning the cache memory makes it possible to increase the robustness of the cache memory with respect to side-channel attacks in which a malicious process attempts to observe the state of the cache memory. However, this solution also leads to an ineffective use of the cache memory because free zones in a partition cannot be used by other processes to store information.

One advantageous way of remedying the latter drawback while partitioning access to the cache memory has been suggested in the following article: Zhenghong Wang et al.: New cache designs for thwarting software cache-based side channel attacks, ACM SIGARCH Computer Architecture News, volume 35, pages 494-505, 2017.

This article teaches that, when a process is seeking to read a word at an address @r, it transmits a request to the cache memory. This request contains the address @r. The address @r contains an address $@_{S_{i,r}}$ of a set $S_{i,r}$ of lines of the cache memory that are liable to contain the sought-after word. The address $@_{S_{i,r}}$ is then converted using a pre-recorded table of permutations into a converted address $@_{S_{i,t}}$. It is this address $@_{S_{i,t}}$ that is then used to seek the word in the cache memory and not the address $@_{S_{i,r}}$. In this context, this article teaches that to partition access to the cache memory by first and second processes it is enough, in an initialization phase, to associate therewith different tables of permutations. This way of partitioning access to the cache memory limits the existence of free zones that cannot be used by other processes to store information.

In contrast, in any event, when access to the cache memory is partitioned, the processes can no longer share data or instructions via the cache memory. In this case, for each word that must be read by first and second processes, the cache memory must comprise one example of this word in each of the partitions of the first and second processes. This therefore increases the redundancy of the data/instructions stored in the cache memory and decreases the efficiency of use of the cache memory. In particular, the solution described in the article by Zhenghong Wang et al. does not allow this drawback to be remedied.

Other prior art is known from:
US2016/170889A1,
US2012/297110A1,
US2018/046808A1,
JP2012023618A.

The invention aims to provide a method for managing the cache memory of an electronic processor that preserves the advantages of that described in the article by Zhenghong Wang et al. while permitting an even more effective use of the cache memory.

To this end, one subject of the invention is therefore a method for managing a cache memory according to Claim 1.

Embodiments of this method may comprise one or more of the features of the dependent claims.

Another subject of the invention is a unit for managing a cache memory of an electronic processor.

The invention will be better understood on reading the following description, which is given, merely by way of nonlimiting example, with reference to the drawings, in which.

In these figures, the same references have been used to reference elements that are the same. In the rest of this description, features and functions that are well known to those skilled in the art are not described in detail.

SECTION I: EXAMPLES OF EMBODIMENTS

Figure 1:
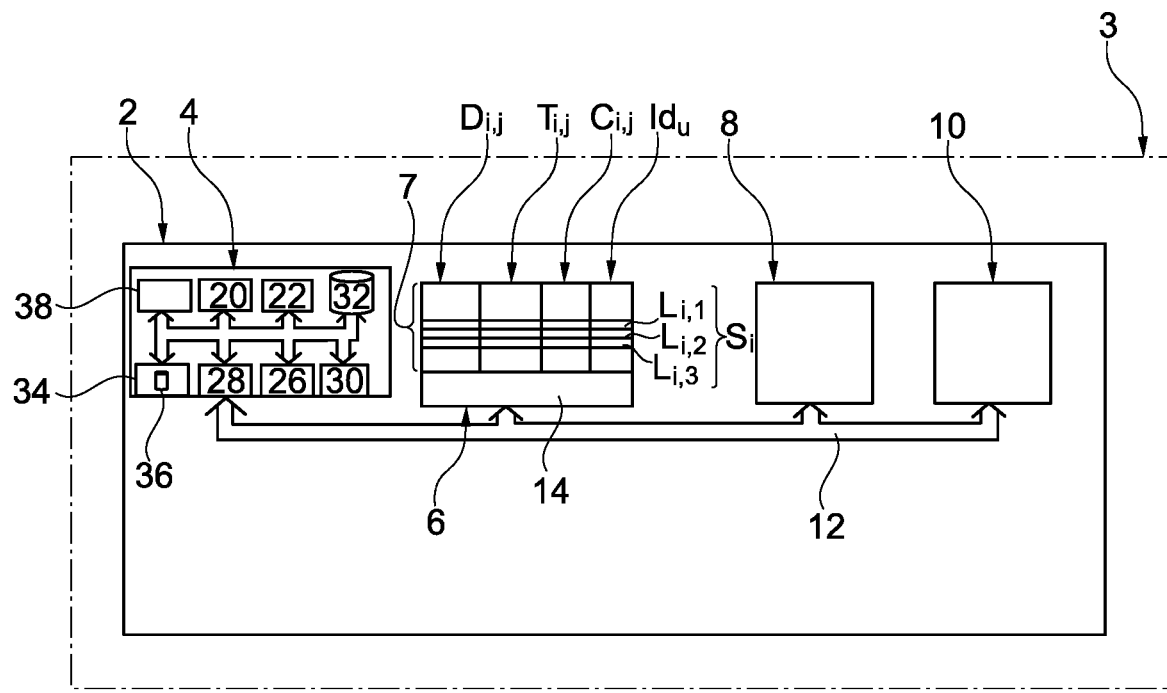
FIG. 1 is a schematic illustration of the architecture of an electronic processor equipped with a cache memory.

FIG. 1 schematically shows the architecture of an electronic processor 2. This processor 2 is typically integrated into a larger system 3 the operation of which is at least partially controlled and commanded by the processor 2. The system 3 is for example a computer, a mobile telephone, a smart phone or any other electronic device the operation of which is at least partially controlled by the processor 2.

Conventionally, the processor 2 comprises:
at least one microprocessor 4,
a cache memory 6,
a main memory 8,
a bulk-storage memory 10, and
buses 12 for transmitting information, which connect these various elements of the processor 2 together.

The cache memory 6 is typically faster than the main memory 8 that is itself faster than the bulk-storage memory 10. The speed of a memory corresponds to the access time required to access information stored in this memory. Currently, typically, the access time of a cache memory is shorter than 30 ns or 20 ns and, generally, longer than 1 ns. The access time of a main memory is at the present time typically shorter than 500 ns or 100 ns and, generally, longer than 30 ns or 50 ns. The access time of a bulk-storage memory is at the present time typically longer than 1 s or 10 μs and, generally, shorter than 10 ms.

Typically, the size of a memory of the processor 2 decreases as the speed of the memory increases for reasons of cost of manufacture. Thus, the size of the cache memory 6 is smaller than the size of the main memory 8, which itself is smaller in size than the bulk-storage memory 10. The size of a memory is expressed in bytes. The size of the cache memory 6 is, for example, smaller than 4 MB and conventionally larger than 60 kB. The size of the main memory 8 is conventionally larger than 256 MB or 1 GB and, generally, smaller than or equal to 16 GB or 32 GB. The size of the bulk-storage memory 10 is for its part conventionally larger than 4 GB or 1 TB.

Here, the memories of the processor 2 are classed by increasing access time. Thus, below, the expression "memory of higher rank" will be understood to mean a memory the access time of which is longer than that of the current memory.

Generally, the memories 6 and 8 are volatile random-access memories. For example, the memory 6 is a static random-access memory (SRAM). The main memory 8 is for example a dynamic random-access memory (DRAM).

The bulk-storage memory 10 is generally a nonvolatile memory. Many different technologies exist for producing such a bulk-storage memory. For example, the memory 10 may be a magnetic tape, a hard disk, an optical disc such as a CD, a DVD or a Blue-ray disc, a magneto-optical disc, a flash memory, an SSD (solid-state drive) memory, inter alia.

The memory 10 generally contains for example a backup copy of the binary code of the processes to be executed by the microprocessor 4. The memory 10 may also contain copies of the data to be processed by the various processes liable to be executed by the microprocessor 4. Typically, the binary code of the processes and the data to be processed are, for example, loaded into the memory 8 from the memory 10 on turn on of the processor 2 and/or in response to a command to reset the processor 2 or when the execution of a new process by the processor 2 is triggered.

The memory 6 may be a memory external to the microprocessor 4 such as shown in FIG. 1. In this case, the memory 6 is for example, produced on a substrate that is mechanically separate from the substrate on which the various elements of the microprocessor 4 are produced.

The memory 6 is a cache memory that may be used to share words between various processes simultaneously executed by the microprocessor 4. The memory 6 generally comprises a plurality of cache memory levels, referred to as "cache L1", "cache L2", "cache L3", etc. The lowest levels, i.e. typically the level "cache L1", are reserved for use by a single process executed by the microprocessor 4. Therefore, it is generally the highest levels of the memory 6 that are used to share words between a plurality of processes. Below, the description given relates solely to these one or more levels of the cache memory 6 that are used to share words in read-only mode between a plurality of processes. Thus, in the rest of this text, unless otherwise indicated, the term "memory 6" will be understood to mean the level of the memory 6 that is used to share words in read-only mode between a plurality of processes.

In this text, unless otherwise indicated, the term "word" is understood to mean both:
an instruction or segment of instruction of the binary code of a process executable by the microprocessor 4, and
a datum or segment of datum corresponding to an operand on which an instruction executed by the microprocessor 4 operates.

The cache memory 6 serves as intermediary storage between the main memory 8 and the microprocessor 4. Instead of directly accessing the main memory 8, which has a high latency, the microprocessor 4 will first check to see whether the word is present in the cache memory. There thus exists two particular cases:

Case 1): The word is present in the cache memory 6, this corresponding to the case referred to as a "hit" or "cache hit". In this case, the word is transferred directly to the microprocessor 4 from the cache memory 6. Memories of rank higher than the memory 6 are then not accessed in order to obtain this word.

Case 2): The word is absent from the cache memory 6. This particular case corresponds to that known referred to as a "miss" or "cache miss". In this case, the cache memory must seek the absent word in a memory of higher rank, i.e. here typically in the main memory 8. This particular case is here referred to as a "cache miss". A cache miss therefore naturally increases the time taken to access the sought-after word.

The cache memory 6 typically comprises a data storage medium 7. The medium 7 is divided into a plurality of lines $L_{i,j}$ of fixed length. Each line contains a data field $D_{i,j}$. Each field $D_{i,j}$ is divided into $N_m$ words of fixed length. The lengths of a word, of a field and of a line are expressed by the number of bits from which they are composed. For example, the length of a word is typically equal to 32 bits or 64 bits. Below, the description is given for the particular case where the length of a word is equal to 32 bits. Each field $D_{i,j}$ contains an identical number of words. For example, here, each field $D_{i,j}$ contains four words. Thus, the length of the field $D_{i,j}$ is 128 bits.

The lines of the cache memory 6 are grouped into separate sets $S_i$. Each set $S_i$ contains W lines $_{i,j}$. The number W is the same for all the sets $S_i$. Below, the index "i" unambiguously identifies one set $S_i$ among the other sets of lines that the memory 6 contains. For example, the index i is an order number comprised between 1 and s, where s is an integer number equal to T/(W·L), where:
T is the size of the cache memory expressed in bytes,
L is the number of bytes per line, and
W is the number of lines in each set $S_i$.

The index "j" unambiguously identifies one particular line of a set $S_i$. Here, the index j is comprised between 1 and W. This is shown in FIG. 1 for the particular case where W is equal to three.

In this embodiment, the memory 6 is a W-way associative cache memory. In this case, the integer number W is higher than or equal to 2 and generally lower than 128 or 64 or 16.

The position of each set $S_i$ in the cache memory 6 is given by an address $@_{Si}$ called the "line set address". There are s therefore here s different line set addresses $@_{Si}$. Below, the minimum number of bits required to code the address $@_{Si}$ of a set $S_i$ is denoted n and the set that contains all the possible addresses $@_{Si}$ is denoted $E_S$.

The position of a particular word in the field $D_{i,j}$ is indicated by an index "$d_r$" that identifies the position of the word in this line. The index $d_r$ is a number comprised between 1 and $N_m$. Typically, the words of a given field $D_{i,j}$ are placed immediately behind one another.

In addition to the field $D_{i,j}$, each line $L_{i,j}$ contains:
a line tag $T_{i,j}$,
a line counter $C_{i,j}$, and
an identifier $Id_u$ of a process.

The tag $T_{i,j}$ contains a value that allows the line $L_{i,j}$ that contains the sought-after word to be unambiguously selected among the W lines $L_{i,j}$ of the set $S_i$. To this end, the tag $T_{i,j}$ is constructed from the bits of the address $@r_r$ of the sought-after word that have not already been used to define the address $@_{Si}$ of the set $S_i$ liable to contain the line $L_{i,j}$ and to define the index $d_r$. For example, a hash function may be applied to these bits of the address of the sought-after word to obtain the tag $T_{i,j}$.

The counter $C_{i,j}$ contains a value that allows it to be determined whether the line $L_{i,j}$ is obsolete or not. The construction of the value of the counter $C_{i,j}$ and the use thereof are described in more detail below.

The identifier $Id_u$ is the identifier of the process that, during its execution, caused the line $L_{i,j}$ to be loaded into the memory 6.

Each line $L_{i,j}$ may contain additional fields such as an information bit that allows this line to be marked as being valid and, alternately, invalid. Conventionally, a line $L_{i,j}$ marked as being invalid must be processed as though it contained no words. Thus, a line $L_{i,j}$ marked as invalid is intended to be erased and replaced by another line loaded from the main memory 8.

Each line $L_{i,j}$ may also contain a bit that allows this line $L_{i,j}$ to be marked as having been modified. This bit is often said to be "dirty". When a line $L_{i,j}$ is marked as modified, the field $D_{i,j}$ that it contains is then copied to the main memory 8 before, for example, this line is marked as invalid.

The cache memory 6 also comprises an electronic managing unit 14. This unit 14 is notably configured to:
in response to a request to read a word from the cache memory 6, send the sought-after word to the originator of the request if this word was found in the cache memory 6 and otherwise trigger a cache miss, and
in response to a request to write a word to the cache memory 6, replace the old value of this word stored on the medium 7 with its new value and, in the case where the word to be written was not able to be found in the cache memory 6, trigger a cache miss.

For example, when the unit 14 triggers a cache miss, it sends a request to a memory of higher rank, typically here the main memory 8, in order to trigger loading into the cache memory 6 of the lines that contain the sought-after word. The unit 14 then manages the storage of the lines that are provided to it in response to its request.

The microprocessor 4 here notably comprises:
an arithmetic logic unit 20;
a set 22 of registers;
a control module 26;
a data input/output interface 28;
an instruction loader 30 comprising a program counter;
a queue 32 of instructions to be executed;
a unit 34 for managing virtual memory; and
a generator 38 of values for a parameter q.

By way of illustration, the microprocessor 4 has an RISC architecture (RISC standing for Restricted Instruction Set Computer).

The loader 30 loads into the queue 32 the next instruction to be executed by the unit 20 from the memory 6 or from a memory of higher rank. More precisely, the loader 30 loads the instruction to which the program counter points.

The unit 20 is notably configured to execute one after the other the instructions loaded into the queue 32. The instructions loaded into the queue 32 are generally systematically executed in the order in which these instructions were stored in this queue 32. The unit 20 is also capable of storing the result of the execution of these instructions in one or more of the registers of the set 22.

The module 26 is configured to move data between the set 22 of registers and the interface 28. The interface 28 is notably able to read words from the memory 6 and, alternately, to write words to the memory 6. Here, to read a word, the microprocessor 4 generates and sends via the interface 28 a request to read this word. This read request notably comprises a physical address $@r_r$ of the word to be read from the main memory 8.

To this end, the address $@r_r$ comprises:
an address $@_{Si,r}$ of a set $S_i$ of the cache memory 6 liable to contain the word to be read;
an index $d_r$ that identifies the position of the word to be read in the field $D_{i,j}$ of the W lines $L_{i,j}$ of the set $S_i$ identified by the address $@_{Si,r}$; and
a tag $T_r$ that allows, among all of the W lines $L_{i,j}$ of the set $S_i$ corresponding to the address $@_{Si,r}$, the line that contains the word to be read, if this line exists, to be unambiguously selected.

The tag $T_r$ is typically constructed by implementing the same algorithm as that implemented to construct each of the tags $T_{i,j}$ stored in the cache memory 6. Thus, if one of the lines $L_{i,j}$ of the set $S_i$ contains the word to be read, its tag $T_{i,j}$ is identical to the tag $T_r$. This allows it to be unambiguously identified as being the line that contains the word to be read among the W lines $L_{i,j}$ of the set $S_i$.

This embodiment is described with respect to the conventional case in which a virtual memory system is implemented. In this case, the memory space of each executed process corresponds to a wide continuous range of virtual addresses. When a process desires to access in read mode or write mode a word stored in the main memory 8, the virtual address $@r_v$ of this word is converted into a physical address $@r_r$ of this word in the main memory 8. It is the unit 34 that is tasked with this conversion. This unit 34 is known as the memory management unit (MMU). The general operating principle of the unit 34 is known, and hence only details required to understand the invention will be described.

The virtual address $@r_v$ is conventionally composed of two fields: a virtual page field $P_v$ and an offset $O_r$. The field $P_v$ is also called the "page number". The field $P_v$ identifies the virtual page in which the sought-after word is located. A virtual page is a continuous range of addresses. All the virtual pages have the same size. The size of a virtual page is often larger than 1 kB or 2 kB and, generally, smaller than 1 GB. Here, the size of a page is equal to 4 kB. The field $P_v$ identifies the virtual page that contains the sought-after word among all of the virtual pages of the memory space of the process. The offset $O_r$ identifies the position of the sought-after word in the virtual page.

To obtain the physical address $@r_r$ of the sought-after word from its virtual address $@r_v$, the unit 34 uses a page table 36. For example, the table 36 is an inverted page table. Each line of the table 36 is known as a page table entry (PTE). An example of a structure of this table 36 is described in more detail with reference to FIG. 2.

The generator 38 generates a new value of a parameter q each time that it is executed. This new value is swapped in the table 36 for a preceding value of the parameter q stored in this table. The function of the values of the parameter q stored in the table 36 is described below with reference to the process of FIG. 4. In this embodiment, the generator 38 randomly or pseudo-randomly draws each new value of the parameter q from a set $E_q$ of $2^n$ values comprised between 0 and $2^n-1$.

Figure 2:
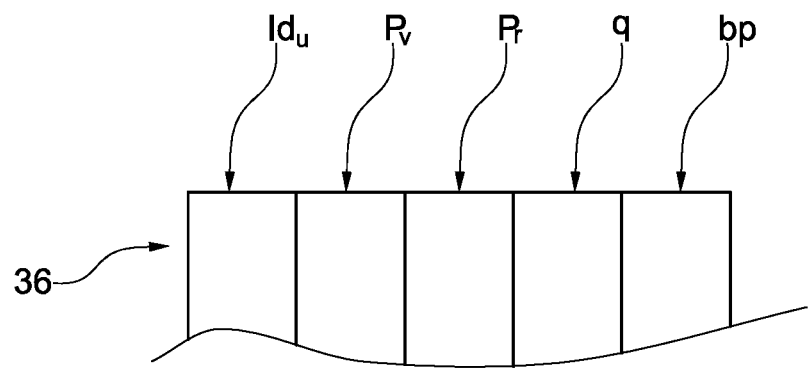
FIG. 2 is a schematic illustration of the architecture of a page table used in the processor of FIG. 1.

FIG. 2 schematically shows the structure of the table 36. Only five columns of the table 36 have been shown. In FIG. 2, each of these columns is identified by the name of the field that it contains. The columns $Id_u$, $P_v$ and $P_r$ therefore respectively contain the identifier $Id_u$ of the process, the field $P_v$ of a virtual page and the field $P_r$ of a physical page corresponding to the field $P_v$ contained on the same row. Thus, using the table 36, the unit 34 is capable of constructing the physical address $@r_r$ corresponding to the virtual address $@r_v$. For example, the address $@r_r$ is obtained by replacing the field $P_v$ with the content of the field $P_r$. Conventionally, the field $P_v$ serves as index in the table 36. In this case, since the number of the row of the table 36 is equal to the content of the field $P_v$, it is not necessary to store the column $P_v$ in the table 36. However, to simplify the following explanations, the description is given as though the column $P_v$ was stored in the table 36. Specifically, this changes nothing as to the technical teaching of the present patent application.

The columns q and bp contain the value of the parameter q and the value of a bit bp, respectively. The bit bp indicates that the page is shared in read-only mode between a plurality of processors when it takes the value "1". In the contrary case, the bit bp takes the value "0". For example, the bit bp is equal to "0" when only the process, corresponding to the identifier $Id_u$ contained in the same row, uses this page or when the page is shared in read mode and in write mode. Each of the rows of the table 36 therefore forms a pre-recorded relationship that associates the values of the fields $Id_u$, $P_v$, $P_r$, q and bp with one another.

The table 36 also generally comprises other additional columns that are not shown such as, for example, a column that contains a field indicating whether the requested page is actually located in the memory 6 or not. The table 36 may also contain, in these additional columns, the access rights of the page, such as read rights, write rights or execution rights.

Figure 3:
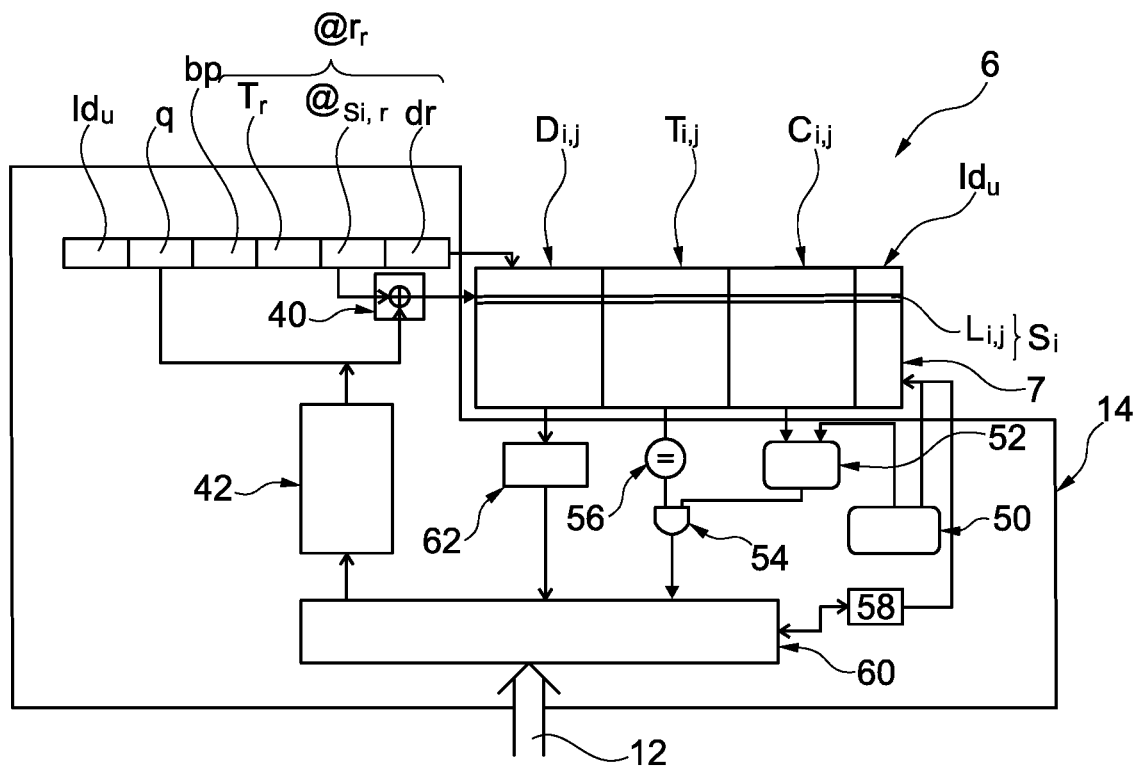
FIG. 3 is a schematic illustration of a first embodiment of a unit for managing the cache memory of the processor of FIG. 1.

FIG. 3 schematically shows a first possible embodiment of the unit 14 for managing the cache memory 6. The unit 14 is configured to implement the managing method described in more detail with reference to FIG. 4.

The unit 14 comprises registers in which are stored the various data contained in the read request received by the memory 6. Here, the read request contains the identifier $Id_u$, the tag $T_r$, the address $@_{Si,r}$, the index $d_r$, the value of the parameter q and the value of the bit bp. In this figure, the registers containing the identifier $Id_u$, the tag $T_r$, the address $@_{Si,r}$, the index $d_r$, the value of the parameter q and the value of the bit bp have been given the references $Id_u$, $T_r$, $@_{Si,r}$, $d_r$, q and bp, respectively.

The unit 14 comprises a function 40 for converting the address $@_{Si,r}$ into a converted set address $@_{Si,t}$. The function 40 is a bijective function that associates with each address $@_{Si,r}$ one and only one address $@_{Si,t}$. Such a function 40 is known as a "permutation". Thus, whatever the address $@_{Si,r}$, this address $@_{Si,t}$ belongs to the set $E_s$. More precisely, the function 40 is defined to permute at least $P_c$ % of the addresses $@_{Si,r}$. In other words, the function 40 associates with more than $P_e$ % of the addresses $@_{Si,r}$ contained in the set $E_s$, an address $@_{Si,t}$ the value of which is different from the value of the address $@_{Si,r}$ with which it is associated by this function 40. Here, the number $P_e$ is higher than 50 and, preferably, higher than 80 or 90 or 95. Ideally, $P_e$ is equal to 100.

The function 40 is a function parameterized by the received value of the parameter q. Thus, the value of the address $@_{Si,t}$ depends not only on the value of the address $@_{Si,r}$ but also on the received value of the parameter q. Therefore, each time the value of the parameter q is modified, the function 40 is modified, i.e. it associates a new address $@_{Si,t}$ with a given address $@_{Si,r}$. Each time the value of the parameter q is modified, this modification affects a group of addresses $@_{Si,r}$ containing at least $P_e$ % of the addresses $@_{Si,r}$ of the set $E_s$. Thus, after the value of the parameter q has been modified, each of the addresses $@_{Si,r}$ of this group is converted, by the function 40, into an address $@_{Si,t}$ different from that which was obtained before the modification of the value of the parameter q.

There are a high number of ways to permute numbers of a set. Here, the function 40 simply uses the following relationship: $@_{Si,t}=@_{Si,r}$ XOR q, where the symbol "XOR" is the symbol of the "exclusive or" operation. To this end, the size of the parameter q is here equal to the size of the address $@_{Si,r}$ and therefore equal to n bits.

The unit 14 comprises a queue 42 containing R registers. The size of each of the registers of the queue 42 is equal to n bits. This queue 42 operates on the "first in, first out" (FIFO) principle. In this embodiment, the queue 42 stores in memory the R preceding values of the parameter q. By "preceding value of the parameter q" what is meant is a value of the parameter q that was received in a preceding read request and used to parameterize the function 40. Typically, the number R is an integer number comprised between 1 and $Lmax_R$. The upper limit $Lmax_R$ is, preferably, equal to the value beyond which the time taken to attempt to find a word in the cache memory 6 successively using all the preceding values of the parameter q that are recorded in the queue 42 becomes longer than the time required to read the sought-after word from the main memory 8. Thus, typically, the number R is lower than 50 and generally lower than 16 or 10. Here, the number R is set equal to 8.

The unit 14 also comprises a counter 50 of modifications of the function 40. This counter 50 is incremented by a regular increment each time a new value of the parameter q is received. Typically, the increment size is equal to 1. When the counter 50 reaches a maximum limit $Lmax_{50}$, it generates an overflow signal and returns to its initial value, i.e. here a value of zero.

In this embodiment, the value of the limit $Lmax_{50}$ is higher than the number R and, preferably, greatly higher than the number R. For example, the limit $Lmax_{50}$ is chosen to be higher than 100 or 500 or 1000.

The counter 50 is connected to an input of a comparator 52. The comparator 52 compares the current value of the counter 50 to the value of the line counter $C_{i,j}$ of the line selected using the address $@_{Si,t}$. In case of a match between these two values, the comparator 52 sends a match signal to a logic circuit 54. In the contrary case, the comparator 52 sends a match-absence signal to the circuit 54. Here, there is a match between the value of the counter $C_{i,j}$ and the value of the counter 50 only if the value of the counter $C_{i,j}$ is lower than or equal to $C_m$ and higher than or equal to $C_m-M$, where:

$C_1$ is the current value of the counter 50, and

M is a constant integer number higher than or equal to zero.

Preferably, the number M is set equal to or lower than the number R. Here, the number M is equal to the number R. The value of the counter $C_{i,j}$ of a line $L_{i,j}$ is equal to the value of the counter 50 at the moment at which this line $L_{i,j}$ was stored in the cache memory 6. Thus, there is a match between the values of the counter $C_{i,j}$ and of the counter 50 only if, between the time at which the line $L_{i,j}$ was stored in the cache memory 6 and the time at which the comparator 52 compares the values of the counter $C_{i,j}$ and of the counter 50, the function 40 has been modified at most M times.

The circuit 54 comprises another input connected to an output of another comparator 56. The comparator 56 compares the received tag $T_r$ to the tags $T_{i,j}$ of the lines of the set $S_i$ selected using the address $@_{Si,t}$. If one of the tags $T_{i,j}$ of the selected set $S_i$ corresponds to the tag $T_r$, then a signal indicating selection of this line $L_{i,j}$ as being that which contains the sought-after word is generated. In the contrary case, i.e. none of the tags $T_{i,j}$ of the selected set $S_i$ corresponds to the tag $T_r$, a signal indicating an absence of selection is generated. A tag $T_{i,j}$ corresponds to the tag $T_r$ if these two tags are identical.

The selection signal is, alternately, the selection-absence signal is received by the circuit 54.

The circuit 54 transmits to a logic controller 60 a hit signal, which indicates that a line $L_{i,j}$ corresponding to the received address $@r_r$, has been found, solely if:

for this line $L_{i,j}$, the comparator 56 has generated a selection signal, and for the same line $L_{i,j}$, the comparator 52 has generated a match signal.

This hit signal therefore corresponds to the case of a hit. In the other cases, a cache-miss signal is transmitted to the logic controller 60.

In parallel to the comparator 56, the unit comprises a word extractor 62. This extractor 62 extracts from the field $D_{i,j}$ of the same line $L_{i,j}$ as that currently being processed by the comparator 56 the word located at the position indicated by the received index $d_r$.

The unit 14 also comprises a detector 58 of abnormal uses of the memory 6. More precisely, in this embodiment, this detector 58 is capable of detecting the three following abnormal uses:

Abnormal use 1): use of the instruction to explicitly evict a line from the memory 6 by an unauthorized process, Abnormal use 2): spatial overload of a set $S_i$, and Abnormal use 3): temporal overload of a set $S_i$.

An instruction to explicitly evict a line from the memory 6 is an instruction that takes as argument an address $@r_r$ and that causes the systematic eviction of the line located at this address $@r_r$ from the memory 6. The line thus removed is for example systematically marked as being invalid, this causing it to be replaced by another line loaded from the memory 8. This explicit eviction instruction is coded into the code of the process executed by the microprocessor 4. It for example corresponds, in assembly language, to the mnemonic CLFLUSH when the microprocessor 4 is an Intel® microprocessor. Here, the use of the explicit eviction instruction by a process is considered to be excessive if the number of times this process triggers the execution of this instruction exceeds a predefined threshold S1.

Abnormal use 2) corresponds to the situation in which a process has caused a number of lines higher than a predefined threshold S2 to be loaded into the same set $S_i$. The threshold S2 is lower than or equal to the number W. The threshold S2 is typically higher than 0.6 W or 0.8 W.

Abnormal use 3) corresponds to the situation in which a process accesses a given set $S_i$ with a frequency higher than a predefined threshold S3.

To this end, the detector 58 has access to the identifiers $Id_u$ of the lines selected with the address $@_{Si,t}$ and communicates with the logic controller 60.

The logic controller 60 is notably configured to:

select the W lines $L_{i,j}$ of the set $S_i$ located at the address $@_{Si,t}$, constructed by the function 40 from the received address $@_{Si,r}$, if one of the W selected lines $L_{i,j}$ triggers a selection signal, then the logic controller 60 triggers in response, in the case of a read request, the transmission of the extracted word, load from the main memory 8 and store in the cache memory 6 a new set of lines containing the word corresponding to the address $@r_r$ contained in the received request if this word was not able to be found in the cache memory 6, execute an explicit eviction instruction to evict a line from the memory 6 and to inform the detector 58 thereof, trigger the generation of a new value of the parameter q when an abnormal use of the memory 6 is detected by the detector 58.

The operation of the processor 2 and of the cache memory 6 will now be described with reference to the method of FIG. 4. This operation is described in the particular case where two processes share in read-only mode, at least initially, words stored in the same physical page. This shared page is shared in read-only mode. For example, the words shared in read-only mode are data and/or instructions of a common executable function. The shared words are stored once in the memory 6 and are accessible by both processes. Thus, use of the memory 6 is optimized. Specifically, it is not necessary to store in this memory 6 a first copy of the shared words for one of the two processes and, at a different location in the memory 6, a second copy of the same words for the other of the two processes.

The case of a page shared in write mode is not addressed here. Specifically, when a page is shared in write mode between a plurality of processes, it is not possible to apply to this page cache-memory partitioning techniques. Therefore, either it is forbidden to share a page in write mode or care is taken to ensure that the page shared in write mode does not contain sensitive instructions or data. Therefore, in this method access to the pages shared in write mode is, for example, achieved in a conventional way. To this end, the function 40 is not used and, for example, it is the address $@_{Si,r}$ directly that is used to select the lines that contain the sought-after word. The write-mode access to the memory 6 is therefore not described below.

The pages of the memory 6 that are not shared between a plurality of processes also pose no particular security problem. Thus, in this method, for example, non-shared pages are also accessed conventionally. Such access is therefore not described below.

In an initialization phase 70 the generator 38 generates an initial value of the parameter q for each of the rows of the table 36. In this phase, a different value of the parameter q is generated and associated with each different physical page. In contrast, in the phase 70, the physical pages that are shared in read-only mode between a plurality of processes are associated with the same value of the parameter q. As explained below, this allows, by default, the memory 6 to be effectively used by limiting the redundancy of the words stored in these pages shared in read mode.

Next, a phase 72 of simultaneous execution of a plurality of processes by the processor 2 is triggered. The processor 2 here has the ability to simultaneously execute a plurality of processes. To this end, for example, the processor 2 executes an operating system that allows the simultaneous execution of these various processes by the microprocessor 4 to be ordered in time. By virtue of this, all the processes are alternately executed by the same processor 4. Likewise, the cache memory 6 is accessible and usable by all the simultaneously executed processes.

The execution of a plurality of processes by a microprocessor is well known to those skilled in the art. Thus, only the access to and the management of the cache memory 6 are described in greater detail below. More precisely, below the following are described:
- a step 80 of recording lines $L_{i,j}$ in the cache memory 6, then
- a step 82 of read access.

In addition, in parallel to the steps 80 and 82, during the execution of the processes by the microprocessor 4, the unit 14 executes a step 86 of monitoring use of the memory 6.

In step 86, each time a shared page of the memory 6 is accessed in read-only mode by a process u, the detector 58 updates, in an operation 88, the values of three indicators $I_{1u}$, $I_{2u,i}$ and $I_{3u,i}$ specifically associated with the process u that accessed this page that is shared in read mode only. Below, the index "u" is used to identify the process u. There are therefore as many indicators $I_{1u}$, $I_{2u,i}$ and $I_{3u,i}$ as there are processes that are being executed by the microprocessor 4 and that share words contained in pages in read mode only. The indicators $I_{1u}$, $I_{2u,i}$ and $I_{3u,i}$ are constructed to detect the abnormal uses 1), 2) and 3), respectively.

Each time that a process u accesses a shared page of the memory 6, the value of the bit bp associated with this page and the value of the identifier $Id_u$ of this process are transmitted to the memory 6. Thus, the unit 14 knows whether the read-mode access is an access to a shared page by examining the received value of the bit bp. The unit 14 also knows the value of the identifier $Id_u$ and may therefore select the indicators $I_{1u}$, $I_{2u,i}$ and $I_{3u,i}$ corresponding to the received identifier $Id_u$. Here, the indicators $I_{1u}$, $I_{2u,i}$ and $I_{3u,i}$ are updated solely if the received value of the bit bp is equal to 1.

The indicator $I_{1u}$ is incremented by a predefined increment each time the process u executes an explicit eviction instruction. For example, the predefined increment is equal to 1.

The indicator $I_{2u,i}$ is set equal to the number of lines of the set $S_i$ that are associated with the identifier $Id_u$ of the process u that is accessing one of the lines of this set $S_i$.

An indicator $I_{3u,i}$ is associated with each set $S_i$ of the memory 6 and each value of the identifier $Id_u$. The indicator $I_{3u,i}$ is representative of the frequency of access to the lines of the set $S_i$ by the process u. Here, the indicator $I_{3u,i}$ is for example updated in the following way:
- each time a process different from the process u accesses the set $S_i$, the value of the indicator $I_{3u,i}$ is decremented by a predefined decrement, for example equal to 1, and
- each time the process u accesses a line of the set $S_i$, the value of the indicator $I_{3u,i}$ is incremented by a predefined increment, for example equal to 1.

Next, in an operation 90, the indicators $I_{1u}$, $I_{2u,i}$ and $I_{3u,i}$ are compared to the predefined thresholds S1, S2 and S3, respectively. If the values of none of these indicators $I_{1u}$, $I_{2u,i}$ and $I_{3u,i}$ exceed these thresholds S1, S2 and S3, then no abnormal use of the memory 6 by the process u is detected. The method then returns to the operation 88 without triggering a modification of a value of the parameter q.

If the updated value of one of the indicators $I_{1u}$, $I_{2u,i}$ and $I_{3u,i}$ exceeds one of these thresholds S1, S2 and S3, then, in an operation 92, the detector 58 detects an abnormal use of the memory 6 by the process u. It then triggers the generation of a new value for the parameter q. Here, to this end, it informs the microprocessor 4 that an abnormal use of the memory 6 by the process u has been detected. In addition, in the operation 92, the value of the parameter q is recorded in the queue 42. In parallel, the counter 50 is incremented.

In response, in an operation 94, the microprocessor 4 immediately modifies the value of the parameter q associated, in the table 36, with the identifier $Id_u$ of this process u and with the field $P_r$ of the shared page. In contrast, the value of the parameter q associated in the table 36 with the same field $P_r$ and with identifiers of other processes is not modified. More precisely, in the operation 94, the generator 38 randomly or pseudo-randomly generates a new value for the parameter q. Next, the unit 34 replaces the current value of the parameter q of the row containing the identifier $Id_u$, of the process u and the page field $P_r$ with this new value of the parameter q.

The fact of solely modifying the value of the parameter q associated with the process u makes it possible to partition:
- the access of the process u to this shared page, and
- the access to the same page by the other processes being executed and that share with this process u read access to this page.

More precisely, the modification of the value of the parameter q completely modifies the way in which the process u accesses this shared page, this increasing the robustness of the method with respect to side-channel attacks. Specifically, each modification of a value of the parameter q associated with a process u simultaneously impacts most of the set addresses of the shared page. Thus, to access this shared page, the addressing of the cache memory 6 before the modification of the value of the parameter q is very different from the addressing of the cache memory 6 after this modification. Thus, this makes it very difficult to implement side-channel attacks that attempt to obtain secret information by observing the values of the addresses accessed by a process in this page.

For example, in a first operation, the process u executed by the microprocessor 4 reads a word $M_1$ at an address $@r_{r1}$. The address $@r_{r1}$ contains the tag $T_r$, the address $@_{Si,r}$ and the index $d_r$. The address $@_{Si,r}$ is converted, by the function 40, into an address $@_{S1,r}$. This request thus triggers access to first lines $L_{i,j}$ of a set $S_{1,r}$ located in the memory 6 at the address $@_{S1,r}$. Subsequently, the detector 58 detects an abnormal use of the memory 6 by this process u, this triggering the execution of the operation 94. Thus, in subsequent operations in which the word $M_1$ is read by this process u, the value of the parameter q contained in the read request will be different. After this modification, the address $@_{Si,r}$ is converted, by the function 40, into an address $@_{S2,r}$ that is different from the address $@_{S1,r}$. The same operation of reading the word $M_1$ therefore triggers access to second lines $L_2$, of a second set $S_{2,r}$ located at the address $@_{S2,r}$. It is therefore more difficult to obtain information on the type and nature of the information accessed from a cache memory by observing only the access to this cache memory 6.

Following this modification of the value of the parameter q for the process u, the word that beforehand was sought in the set $S_{1,t}$ is now sought in the set $S_{2,t}$. However, the lines of the set $S_{1,t}$ are not moved to the set $S_{2,t}$ each time the function 40 is modified. Only the addressing of the cache memory is modified. This leads to the following situation: before the modification of the value of the parameter q, the sought-after word corresponding to the address $@r_{r1}$ was stored in the set $S_{1,t}$. Thus, before the modification of the value of the parameter q, this word is rapidly found in the cache memory using the address $@r_{r1}$ because the function 40 allows the address $@_{S1,t}$ to be obtained from the address $@_{Si,r}$. After the modification of the value of the parameter q, for the same address $@r_{r1}$, the function 40 generates another address $@_{S2,t}$ that is different from the address $@_{S1,t}$. Since the lines of the set $S_{1,t}$ have not been moved to the set $S_{2,t}$, the sought-after word is not found in the set $S_{2,t}$ and a cache miss is triggered.

A first side-effect related to the modification of the value of the parameter q is therefore that this increases the number of cache misses in a period of time immediately following the modification of this value. This temporarily slows the execution of the processes during this period.

It will be noted that moving the lines of the set $S_{1,t}$ to the set $S_{2,t}$ would have avoided this cache miss. However, as indicated above, the modification of the value of the parameter q affects most of the set addresses. To avoid this cache miss, each time the value of the parameter q is modified, it would therefore be necessary to move a high number of lines of the cache memory 6. In practice, such a movement of a high number of lines of the cache memory takes a lot of time and would unacceptably slow the execution of the processes by the processor 2. In fact, such a movement of lines is worse than the first side-effect indicated above.

A second side-effect related to the absence of movement of the lines of the cache memory 6 is that, following a modification of the value of the parameter q, it is possible for a plurality of examples of the same line to exist in various locations in the cache memory. However, some of these examples may contain obsolete data. This is illustrated in the case of the sets $S_{1,t}$ and $S_{2,t}$ introduced above. Before the modification of the value of the parameter q, the set $S_{1,t}$ contains an example of the line $L_{1,j}$ that contains the sought-after word. The set $S_{2,t}$ does not contain any example of this line $L_{1,j}$. After the modification of the value of the parameter q, the search for the word corresponding to the address $@r_{r1}$ in the set $S_{2,t}$ by the process u causes a cache miss. Conventionally, in response to this cache miss, a line $L_{2,j}$ containing the sought-after word $M_1$ is transferred from the main memory 8 to the cache memory 6 and stored in the set $S_{2,t}$. Thus, from this moment on, the cache memory 6 contains two examples of the same word $M_1$, one being contained in the line $L_{1,j}$ and the other being contained in the line $L_{2,j}$. Given that the line $L_{2,j}$ was loaded into the memory 6 after the line $L_{1,j}$, the words $M_1$ that they contain may be different. For example, this may be the case if, between the times at which the lines $L_{1,j}$ and $L_{2,j}$ were loaded, this word $M_1$ was modified in the memory 8 by another process having the access rights required to do so. Assuming now that after a plurality of subsequent modifications of the value of the parameter q associated with the process u, the function 40 once again associates the address $@_{Si,r}$ with the lines of the set $S_{1,t}$. At this moment, in response to a request to read the word located at the address $@r_{r1}$, the cache memory 6 will return to the process u an obsolete value of the word $M_1$ contained in the line $L_{1,j}$.

As will be understood on reading the rest of the description, the use of the queue 42 allows the first side-effect to be minimized whereas the use of the counter 50 and of the counters $C_{i,j}$ allows the second side-effect to be minimized.

Also, in parallel to steps 80, 84 and 86, the method comprises a step 100 of resetting the cache memory 6. The step 100 is triggered each time the logic controller 60 receives the overflow signal, i.e. each time the counter 50 reaches the limit $Lmax_{50}$. In step 100, the counter 50 is zeroed. In addition, the logic controller 60 marks all of the lines of the cache memory 6 as being invalid. Specifically, following the reset of the value of the counter 50, the values of the counters $C_{i,j}$ no longer allow an obsolete line to be safely distinguished from a non-obsolete line. Marking each line as being invalid causes all the lines of the cache memory to be reloaded from the main memory 8 and, in this case, the values of the counters $C_{i,j}$ associated with each of the lines to be updated.

The execution of step 80 is typically triggered in the case of a cache miss, i.e. in the case where the word the address $@r_r$ of which is specified in the read request was not found in the cache memory 6.

In this case, in an operation 110, the logic controller 60 causes a set of X lines, one of which contains the sought-after word, to be loaded into the cache memory 6 from the main memory 8. The number X may be equal to, higher than or lower than the number s of sets $S_i$. Here, the number X is lower than or equal to the number s. Conventionally, this set of X lines is a set of X lines that are immediately contiguous to one another in the main memory 8. This operation of transferring this set of X lines from the main memory 8 to the cache memory 6 is carried out in a conventional way and is therefore not described in more detail.

In an operation 112, the unit 14 swaps the X lines transferred from the main memory 8 for X lines of the cache memory 6. Here these X lines are each stored in a respective set $S_i$. In particular, the line that contains the sought-after word is stored in the set $S_i$ located at the address $@_{Si,t}$. The address $@_{Si,t}$ is the converted address obtained from the address $@_{Si,r}$ contained in the read request that triggered the cache miss. The address $@_{Si,t}$ is obtained using the function 40 parameterized with the value of the parameter q contained in the same read request. Similarly, the address $@_{Si}$ of the set $S_i$ in which one other of these X lines must be recorded is defined so that subsequent read-out of a word from this line does not cause, if possible, a cache miss. To this end, the address $@_{Si}$ is also determined using the function 40 parameterized with the value of the parameter q contained in the read request that caused the cache miss.

In an operation 114, each time a new line $L_{i,j}$ is stored in the cache memory 6:
  the value of the counter $C_{i,j}$ associated with this line is set equal to the current value of the counter 50, and
  the value of the identifier $Id_u$ contained in the read request is associated with this line $L_{i,j}$. Here, this value of the identifier $Id_u$ is stored in the column $Id_u$ of the medium 7.

Lastly, in an operation 116, the word identified by the received request is read and sent to the microprocessor 4.

Step 82 starts with an operation 128 of transmitting, to the memory 6, a read request. Below, this step 128 is described for the particular case of read-out of a word by the process u. However, everything described with respect to this particular case applies to any other process executed by the microprocessor 4 and that desires to read a word from a page shared in read-only mode of the memory 6.

To do this, during the execution of the process u by the microprocessor 4, an instruction to read a word is loaded into the queue 32 of instructions to be executed. At this stage, the read instruction contains an operand that contains the virtual address $@r_v$ of the word to be read. During the execution of this instruction, the virtual address $@r_v$ is converted into a physical address $@r_r$ by the unit 34. To do this, the unit 34 replaces the field $P_v$ contained in the address $@r_v$ with the content of the physical-page field $P_r$. Below, the values of the identifier $Id_u$, of the fields $P_v$ and $P_r$ of this page, of the parameter q and of the bit bp associated with one another in the same row of the table 36 are denoted $Id_1$, $P_{1v}$, $P_{1r}$, $q_1$ and $bp_1$, respectively. To this end, the unit 34 selects, in the table 36, the line that contains the value $Id_1$ in the column $Id_u$ and the value $P_{1v}$ in the column $P_v$. The value $P_{1r}$ associated with the value $P_{iv}$ is then that contained in the column $P_r$ of the line thus selected. The value $q_1$ of the parameter q and the value $bp_1$ of the bit bp associated with the value $P_{1v}$ are also obtained from this selected row. In this embodiment, the offset $O_r$ is kept unchanged. The microprocessor 4 then transmits a read request to the memory 6 containing the values $Id_1$, $q_1$, $bp_1$ and the address $@r_r$. The address $@r_r$ contains the tag $T_r$, the address $@_{Si,r}$ and the index $d_r$.

In an operation 130, the memory 6 received this request to read a word.

In an operation 132, the values $Id_1$, $q_1$ and $bp_1$ are stored in the registers $Id_u$, q and bp of the unit 14, respectively. The tag $T_r$, the address $@_{Si,r}$ and the index $d_r$ are also stored in the registers $T_r$, $@_{Si,r}$ and $d_r$ of the unit 14, respectively.

In an operation 134, the function 40 then converts the address $@_{Si,r}$ into an address $@_{Si,t}$. During the execution of the operation 134, it is the value $q_1$ currently stored in the register q that is selected and used to parameterize the function 40. The address $@_{Si,t}$ therefore depends both on the received address $@_{Si,r}$ and on the value currently stored in the register q.

Next, in an operation 136, the unit 14 selects from the medium 7 the set $S_i$ of W lines $L_{i,j}$ that is located at the address $@_{Si,t}$.

In an operation 138, the comparator 56 processes one after the other the W selected lines. For each of the lines $L_{i,j}$ thus selected, the comparator 56 compares the tag $T_{i,j}$ of this line to the received tag $T_r$ and generates the selection signal to select this line only if the tags $T_{i,j}$ and $T_r$ are identical.

In parallel, in an operation 140, for the same line as that currently being processed by the comparator 56, the comparator 52 compares the value of the counter $C_{i,j}$ of this line to the current value of the counter 50. Only if the value of the counter $C_{i,j}$ and the value of the counter 50 match does the comparator 52 generate the match signal.

Also in parallel, in an operation 142, the extractor 62 extracts, from the field $D_{i,j}$ of the line currently being processed by the comparator 56, the word located at the position indicated by the received index $d_r$.

In an operation 144, the circuit 52 transmits a hit signal to the logic controller 60 only if, for the same line $L_{i,j}$, the selection signal and the match signal have been generated by the comparators 56 and 52, respectively. In any other case, the circuit 54 transmits a cache-miss signal to the logic controller 60.

In response to a hit signal, in an operation 146, the logic controller 60 transmits to the microprocessor 4 the word extracted in the operation 142 and the method returns to the operation 128 in order to process the next read request.

If the circuit 54 has generated a cache-miss signal, the method continues with an operation 148. In the operation 148, the logic controller 60 selects from the queue 42 the preceding value of the parameter q stored therein, and then returns to the operation 134. The operations 134 to 144 are then executed again but this time using the preceding value of the parameter q. If the sought-after word is found in the memory 6 using this preceding value of the parameter q, then operation 146 is executed, this stopping the reiteration of the operations 134 to 144.

In the case where the sought-after word is found in the memory 6 using a preceding value of the parameter q, the operation 146 is however preceded by an operation 150. In the operation 150, the logic controller 60 replaces the W lines $L_{i,j}$ of the set $S_i$ located at the address $@_{Si,t}$ obtained using the received value of the parameter q with the W lines $L_{i,j}$ selected using the preceding value of the parameter q that allowed the sought-after word to be found. Thus, if the same word must be read anew before the next modification of the value of the parameter q, access to this word will be faster because the received value of the parameter q may be used to access it.

In the operation 150, typically, the W lines $L_{i,j}$ located at the address $@_{Si}$, obtained using the preceding value of the parameter q are then marked as being invalid.

In contrast, if the sought-after word is not found in the cache memory 6 using this preceding value of the parameter q, then the operation 148 is executed again. There are then two cases:

First case: there is in the queue 42 a value of the parameter q that has not yet been used to execute the operations 134 to 144. In this case, these operations 134 to 144 are executed again with this new preceding value of the parameter q.

Second case: there is, in the queue 42, no longer a preceding value of the parameter q that has not yet been used to execute the operations 134 to 144. In this case, the logic controller 60 triggers the execution of the step 80.

Figure 5:
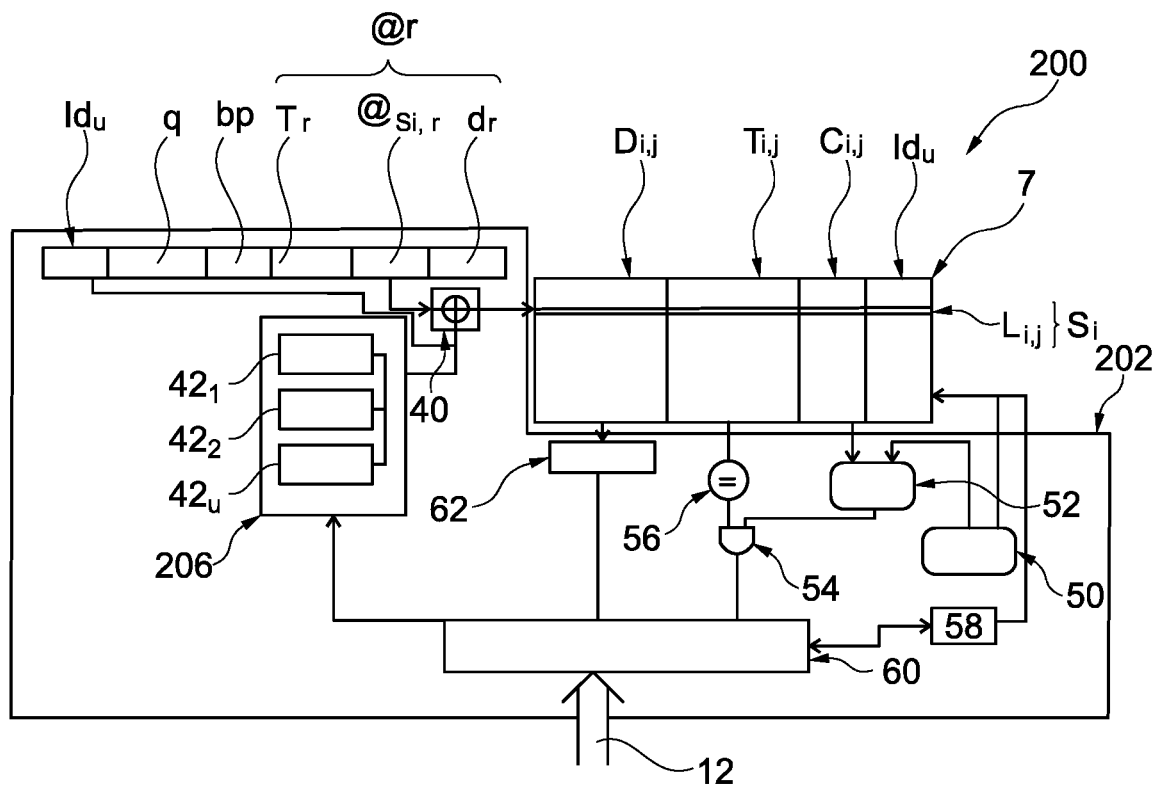
FIG. 5 is a schematic illustration of a second possible embodiment of the unit for managing the cache memory of the processor of FIG. 1.

FIG. 5 schematically shows the architecture of a cache memory 200 capable of being used instead of the cache memory 6 in the processor 2. The cache memory 200 is for example identical to the cache memory 6 except that the managing unit 14 has been replaced by a managing unit 202.

The unit 202 is identical to the unit 14 except that the queue 42 has been replaced by a set 206 of queues $42_u$.

Below, the parameter q associated with one particular process is denoted $q_u$, where the index u is an identifier of the process executed by the microprocessor 4.

The set 206 comprises as many queues $42_u$ as there are different processes being executed. Each queue $42_u$ is associated with a single process u. The index u in the reference number $42_u$ is the identifier of the process u associated with this queue $42_u$.

Each queue $42_u$ is here identical to the queue 42 and operates just like the queue 42 except that it only contains the preceding values of the parameter $q_u$ and therefore only the preceding values of the parameter q associated with one particular process u.

The operation of the unit 202 is identical to that of the unit 14 except that during the operation 148 the preceding value of the parameter q is only selected from the queue $42_u$ associated with the identifier $Id_u$ received in the read request.

Figure 6:
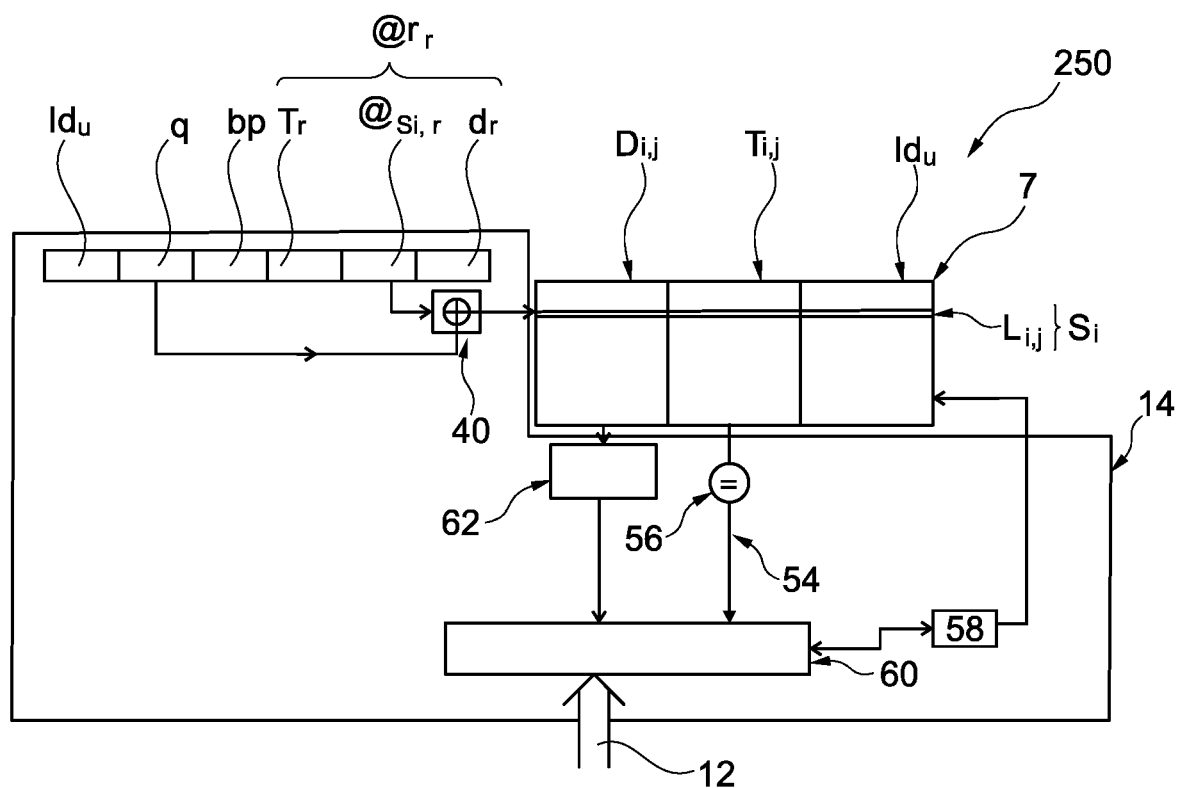
FIG. 6 is a schematic illustration of a third possible embodiment of the unit for managing the cache memory of the processor of FIG. 1.

FIG. 6 shows a cache memory 250 capable of being used instead of the cache memory 6. The cache memory 250 is, for example, identical to the cache memory 6 except that:
the queue 42, the counter 50, the comparator 52 and the circuit 54 are omitted, and
the field $C_{i,j}$ of the lines $L_{i,j}$ is omitted.

In this embodiment, the preceding values of the parameter q are therefore not stored. Likewise, the counter of modification of the values of the parameter q is not employed. Thus, in this embodiment, it is not sought to remedy the first and second side-effects described above. This is notably acceptable if the first side-effect is considered to be acceptable and if the probability that the second side-effect will occur is considered to be negligible. In compensation, the architecture and the operation of the memory 250 are simpler than in the preceding embodiments.

The operation of the memory 250 is identical to that of the memory 6 except that:
  the operations 140, 148 and 150 are omitted,
  step 100 is omitted, and
  in the operation 144, the comparator 56 transmits a hit signal to the logic controller 60 directly when the received tag $T_r$ corresponds to the tag $T_{i,j}$ of the processed line $L_{i,j}$ and, alternately, transmits a cache-miss signal if the received tag $T_r$ has not been able to be found in the W lines $L_{i,j}$ selected using the address $@_{Si,t}$.

SECTION II: VARIANTS

All the variants described in the context of the unit 14 may be transposed and applied to the unit 200 and vice versa. Likewise, most of the variants described in the context of the unit 14 are transposable to the unit 250. Thus, below, the various variants are mainly described only in the context of the managing unit 14.

Variants Regarding the Parameter q:

In one simplified embodiment, a given value of the parameter q is associated with all the page numbers used by a given process. In this case, the value of the parameter q is dependent on the identifier $Id_u$ of the process u but is not dependent on the number of the accessed page. Thus, when the value of the parameter q is modified for a process, this value of the parameter q is modified for all the pages shared in read-only mode associated with this process.

Other methods for selecting the preceding values of the parameter q are possible. In particular, the various values of the parameter q stored in the queue 42 are not necessarily selected in order starting with the most recent value and moving toward the oldest value. For example, in one alternative embodiment, each time a preceding value of the parameter q must be selected, the latter is selected by randomly drawing one among the R preceding values stored in the queue 42. If after a predefined number Rmax of random draws the sought-after word has not been found then a cache miss is triggered. In another possible embodiment, all the values of the parameter q are systematically selected one after the other. Thus, even after a value of the parameter q that allows the sought-after word to be found in the cache memory 6 has been selected, the method does not stop and the following values of the parameter q are nonetheless selected one after the other. Thus, the time taken to search for a word in the cache memory is systematically constant. Hence, it is not possible to obtain information on the position of the preceding value of the parameter q used to find the sought-after word. This embodiment is therefore more robust with respect to side-channel attacks.

Other random or pseudo-random drawing methods may be used to generate a new value of the parameter q. For example, the values of the set $E_q$ are arranged in a predefined order from a first value to a last value. The new value of the parameter q is set equal to the value that immediately follows the preceding value of this parameter in the predefined order. When the preceding value of the parameter q is equal to the last value of the set $E_q$, the new value of the parameter q is set equal to this first value of this set $E_q$. Thus, the value of the parameter q varies cyclically. In another variant, the new value of the parameter q is constructed from its preceding value. For example, the new value is constructed using the following relationship: $q_{new} = q_{old} \cdot k_e \mod p$, where:
  $q_{new}$ and $q_{old}$ are the new and old values of the parameter q, respectively,
  $k_e$ is a constant integer number coded with p bits, and
  $q_{old} \cdot k_e \mod p$ is the modular multiplication of the value $q_{old}$ by the number $k_e$ modulo p.

In the preceding embodiments, the relationship that associates the value of the parameter q with a page number and with a process was described in the particular case where it is stored in the page table 36. However, this relationship may be stored elsewhere. For example, it may be stored in a new table, independent of the table 36, that contains the columns $Id_u$, $P_r$, q and bp but that is devoid of the column $P_v$. This new table is therefore not a page table. This new table may be stored in a memory of the unit 14. In this case, the unit 14 also preferably comprises the generator 38 and the logic controller 60 is configured to:
  carry out the operation 94 instead of the microprocessor 4, and
  select the value of the parameter q associated, in this new table, with the identifier $Id_u$ received in a read request.

In the latter embodiment, the value of the parameter q is not transmitted from the microprocessor 4 to the memory 6. In contrast, the read request still contains the identifier $Id_u$.

There are many different types of page tables. What has been described may be adapted to these various types of page table. In particular, what has been described here may be implemented with a multi-level page table, a virtualized page table and a nested page table.

Variants Regarding the Conversion Function:

Other embodiments of the conversion function are possible. For example, the XOR operation may be replaced by a more complex operation such as an encryption operation employing a complex encryption algorithm such as the AES (Advanced Encryption Standard) encryption algorithm. In the latter case, the received value of the parameter q is used as encryption key to obtain the set address $@_{Si,t}$ from the address $@_{Si,r}$. In this case, the address $@_{Si,t}$ is the cryptogram of the address $@_{Si,r}$.

In another embodiment, the unit 14 comprises a plurality of different permutation matrices pre-recorded in a memory. The address $@_{Si,t}$ is then obtained by multiplying the address $@_{Si,r}$ by one of these matrices. The matrix to be used to obtain the address $@_{Si,t}$ is selected depending on the received value of the parameter q.

As a variant, the set $E_q$ solely contains $2^p$ different values, where the exponent p is an integer number strictly lower than n. In this case, the function 40 must be adapted to take into account the fact that the parameter q is coded with p bits and not with n bits. For example, a first solution consists in only combining p bits of the address $@_{Si,r}$ with the parameter q. Another solution consists in generating a word of n bits from the parameter q coded with p bits then in combining this word of n bits with the address $@_{Si,r}$ in order to obtain the address $@_{Si,t}$. In another variant, the number p is higher than the number n.

In another embodiment, the address $@_{Si,r}$ is also converted for the non-shared pages. In this case, preferably, the value of the parameter q associated with the non-shared pages is modified spontaneously and repeatedly during the execution of a process. By "spontaneous modification" of the value of the parameter q, what is meant is a modification of the value of the parameter q that is triggered even in the absence of detection of an abnormal use of the cache memory. For example, the generation of a new value of the parameter q for a non-shared page is triggered when a counter of the number of times of the cache memory has been accessed exceeds a limit $Lmax_{46}$. Generally, the limit $Lmax_{46}$ is higher than 50 or 100 and lower than 50 000 or 20 000. Here, the limit $Lmax_{46}$ is comprised between 100 and 20 000 and, preferably, between 100 and 5 000 or between 100 and 1 000. Each time the limit $Lmax_{46}$ is reached, the generator 38 resets the access counter to zero. The generation of a new value of the parameter q for a non-shared page may also be triggered periodically. For example, the microprocessor 4 comprises a timer that counts down a length of time T44. Each time the length of time T44 has passed, the generator 38 generates a new value of the parameter q for the non-shared page then restarts counting down the length of time T44. The generation of a new value of the parameter q for a non-shared page may also be triggered on each change of context. By "change of context" what is meant is the fact that the microprocessor 4 stops executing the instructions of a first process in order to continue with or start the execution of a second process.

This spontaneous modification of the value of the parameter q associated with a non-shared page may also be applied to a page shared in read-only mode. In this case, the modification of a value of the parameter q associated with this page shared in read-only mode is not only triggered in case of detection of an abnormal use of the cache memory but also spontaneously and repeatedly. In case of spontaneous modification, the new value of the parameter q for this page is the same for all the processes that share this page. Thus, the spontaneous modifications of the value of the parameter q associated with a page do not prevent this page from being effectively shared between the various processes.

In another embodiment, the unit 14 is modified in order to in addition to permute the received values of the index $d_r$, so as to obtain a converted index $d_{r,r}$. Subsequently, it is this index $d_{r,r}$ that is used to select the word to be read. In other words, what has been described with respect to converting the received address $@_{Si,r}$ may also be applied in addition to the index $d_r$. Anyone skilled in the art will be able to transpose without difficulty the teaching given here in the case of the address $@_{Si,r}$ to the index $d_r$, with a view to obtaining such an embodiment.

Variants Regarding the Detector 58:

Other embodiments of the detector 58 are possible. For example, in a simplified embodiment, the detector 58 is solely capable of detecting a single or two abnormal uses chosen from the group made up of the abnormal uses 1), 2) and 3). In other embodiments, the detector 58 is arranged to detect, in addition or instead, abnormal uses of the memory 6 other than the abnormal uses 1), 2) and 3).

Other algorithms may be used to update the values of the indicators $I_{1u}$, $I_{2u,i}$ and $I_{3u,i}$. For example, the value of the indicator $I_{3u,i}$ is incremented by an increment strictly higher than 1 each time the process u accesses the set $S_i$.

The value of the indicator $I_{1u}$ may be representative of the frequency of execution by the process u of the explicit eviction instruction. In this case, the value of the indicator $I_{1u}$ is updated in a similar way to that described for the indicator $I_{3u,i}$ except that it is the execution of the explicit eviction instruction by the process u that triggers the increment of the value of the counter $I_{1u}$ whereas the execution of another instruction by the same process decrements the value of the indicator $I_{1u}$.

As a variant, the indicator $I_{1u}$ may be replaced by an indicator $I_{1u,a}$, where the index a is an identifier of a group A of one or more sets $S_i$. There are therefore as many indicators $I_{1u,a}$ as there are groups A. The value of the indicator $I_{1u,a}$ is updated as described for the indicator $I_{1u}$ except that its value is updated only if the explicit eviction instruction affects a line $L_{i,j}$ of the group A with which it is associated.

The indicators $I_{2u,i}$ and $I_{3u,i}$ may be associated with a group of a plurality of sets $S_i$ rather than with a single set $S_i$. In this case, the indicators $I_{2u,i}$ and $I_{3u,i}$ are replaced by indicators $I_{2u,g}$ and $I_{3u,g}$, respectively, where the index g is an identifier of a group Gg of a plurality of sets $S_i$. The values of the indicators $I_{2u,g}$ and $I_{3u,g}$ are then updated in an identical way to that described for the indicators $I_{2u,i}$ and $I_{3u,i}$, respectively, except that they are updated on each access to a line $L_{i,j}$ of a set $S_i$ belonging to the group Gg and taking into account all the lines $L_{i,j}$ of all the sets $S_i$ belonging to this group Gg. For example, in one particular case, the group Gg contains all the sets $S_i$ of a given physical page.

In another embodiment, only certain processes are monitored and not others. In this case, the indicators $I_{1u}$, $I_{2u,i}$ and $I_{3u,i}$ are constructed and updated only for the monitored processes and not for the others. For example, the indicator $I_{1u}$ is not updated when the executed process corresponds to a process of the operating system exploited by the microprocessor 4.

Depending on the set $S_i$ accessed, the value of the threshold S3 is not necessarily the same as that used for other sets $S_i$.

As variants, one or more of the indicators $I_{1u}$, $I_{2u,i}$ and $I_{3u,i}$ may be constructed and updated by the microprocessor 4 and not by the unit 14. For example, it may be simpler for the microprocessor 4 and, more precisely, the operating system executed by this microprocessor 4, to be tasked with executing operations 88 and 90 for the indicator $I_{1u}$ instead of the unit 14.

As variants, when the detector 58 detects that the abnormal use of the cache memory by a process u has ceased, then it modifies the value of the parameter q associated with this page and with this process u so that, once again, all the processes that share this page are associated with the same value of the parameter q. For example, the detector 58 detects that an abnormal use has ceased when all the values of all the indicators $I_{1u}$, $I_{2u,i}$ and $I_{3u,i}$ have fallen below the thresholds S1, S2 and S3.

Other Variants:

As a variant, the number M is higher than the number R or strictly lower than the number R. In one particular case, the number M may be set equal to zero.

The bulk-storage memory may be located externally to the processor and connected to this processor by a bus or a data transmission network. Likewise, the main memory may also be mechanically located externally to the processor and connected to this processor by a bus or a data transmission network.

What has been described here is applicable to words and lines of other lengths.

It will also be noted that the teaching given here is also applicable to the case of direct-mapped cache memories. In this case, the number W is equal to one and the address $@_{Si,r}$ corresponds to a single line of the cache memory. In this situation, the indicator $I_{2u,i}$ is not used and, for example, the indicator $I_{2u,g}$ introduced above is then used instead thereof.

In another embodiment, the index $d_r$ is omitted from the request to read a word from the cache memory. In this case, in case of a match between the tag $T_r$ and one of the tags $T_{i,j}$, the cache memory 6 sends to the microprocessor 4 the whole field $D_{i,j}$. It is then the microprocessor 4 that itself extracts the desired word from the received field $D_{i,j}$.

Instead of comprising a single microprocessor, the electronic processor may comprise a plurality of microprocessors each capable of accessing the cache memory 6. In this case, each process executed in parallel to the others is, for example, executed by its own microprocessor. What has been described here in the particular case where the various processes are executed, in parallel, by the same microprocessor 4 works in the same way in the case of such an electronic processor equipped with a plurality of microprocessors.

What has been described here is also applicable to a context in which a paged virtual-memory mechanism is not employed. In this case, if the memory is not paged, the columns $P_v$ and $P_r$ may be omitted from the table 36. The table 36 is then no longer a page table.

The counter 50 was described in the particular case where it is common to all the processes. As a variant, the counter 50 may be replaced by a set of counters containing one counter 50$u$ for each process u being executed. The operation of each counter 50$u$ is identical to the operation of the counter 50 except that the counter 50$u$ solely counts the modifications of the value of the parameter q associated with the process u. The operation of this embodiment is for example identical to that described with reference to the method of FIG. 4 except that it is the counter 50$u$ associated with the process u that is used instead of the counter 50.

Variants of the Method:

As a variant, at the same time as the value of the parameter q associated with a process u is modified following detection of an abnormal use, the value of the parameter q associated with the other processes that share this page with the process u is also modified. Thus, the value of the parameter q associated with these other processes is different from its preceding value after this modification. In this case, in case of detection of an abnormal use of the cache memory by the process u, the values of the parameters q associated with all the processes that share in read-only mode this page are modified.

In another variant, when an abnormal use of the cache memory by the process u is detected, only the value of the parameter q associated with the other processes that share this page with the process u is modified. In this case, the value of the parameter q associated with the process u remains, for example, unchanged even after the detection of an abnormal use. Thus, following this modification, the values of the parameters q associated with the process u and with the other processes that share this page with this process u are different so that access by these various processes to this page is partitioned.

When an abnormal use of the cache memory by a process u is detected, the values of the parameter q that are associated, in the table 36, with all the pages shared with this process u are modified. Thus, in this variant, it is not only the value of the parameter q associated with the shared page on which an abnormal use was detected that is modified.

In one possible variant of the method, the line found in the cache memory using a preceding value of the parameter q is not moved to the set located at the address $@_{S_i,t}$ obtained with the most recently received value of the parameter q. In other words, the operation 150 is omitted.

Figure 4:
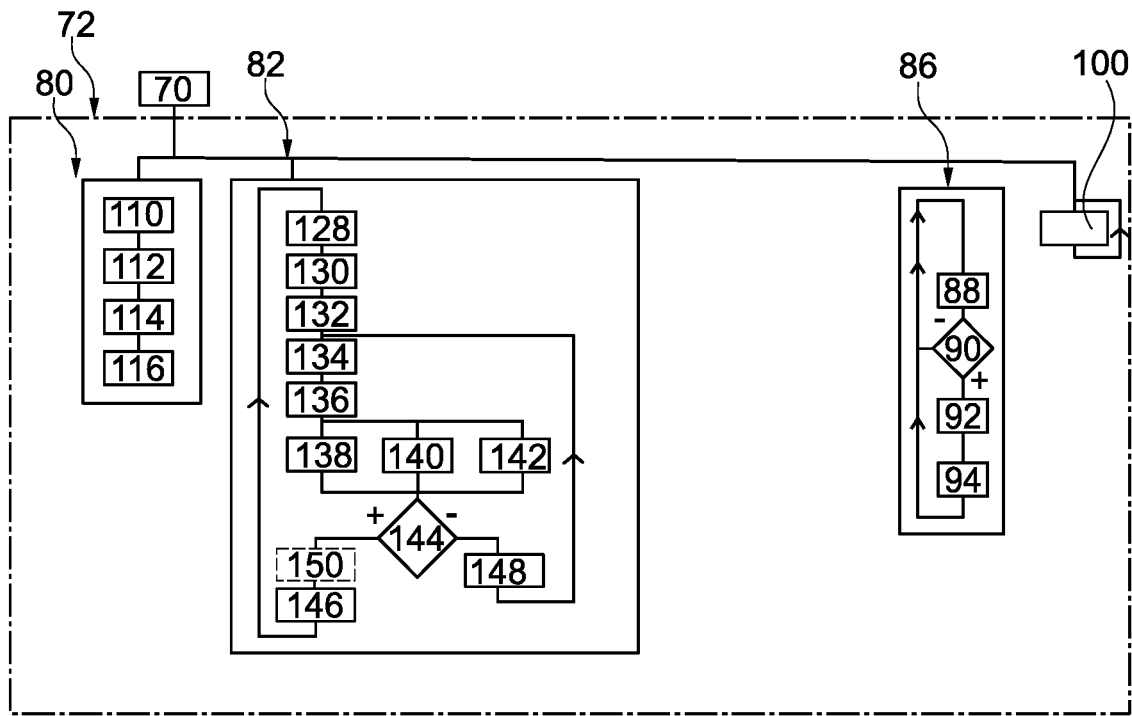
FIG. 4 is a flowchart of a method for managing the cache memory of the processor of FIG. 1.

The order of the operations of the method of FIG. 4 may be modified. For example, in one variant, the operation 140 is executed solely if, in the operation 138, a match is found between the tag $T_r$ and one of the tags $T_{i,j}$. It is also possible to do the inverse, i.e. for the operation 138 to be executed solely if, in the operation 140, the value of the counter $C_{i,j}$ matches the current value of the counter 50.

SECTION III—ADVANTAGES OF THE DESCRIBED EMBODIMENTS

The fact of using the same function 40 for first and second processes makes it possible to prevent the words shared in read-only mode between these two processes from being duplicated in the cache memory. Specifically, provided that the same value of the parameter q is used by these first and second processes, each process may read the same word from the same physical address in the cache memory. It is therefore not necessary to duplicate it, this optimizing use of the cache memory. In contrast, the second process may obtain information on the addresses read by the first process from this page. This may be exploited, if the second process is a malicious process, to obtain sensitive information on the operation of this first process.

In contrast, the fact of using a first value of the parameter q for the first process and a second different value of this parameter q for the second process allows the access of these processes to the cache memory to be partitioned. It then becomes very difficult for the second process to determine which physical addresses of the cache memory are accessed by the first process. This partitioning therefore allows the robustness of the method with respect to side-channel attacks of the cache memory to be increased. Another effect of this is that if the same word must be shared in read-only mode between the first and second processes, this word will then be stored at two different locations in the cache memory, this decreasing how effectively this memory is used.

The fact of automatically switching between, when an abnormal use of the cache memory is detected, a mode in which the words may be shared to a mode in which the cache memory is partitioned allows both security and how effectively the cache memory is used to be improved. Specifically, provided that no abnormal use of the cache memory has been detected, use of the cache memory is optimized since sharing of words via this cache memory between various processes is permitted and implemented. The partitioning of the cache memory between various processes is only employed when it is necessary, i.e. when an abnormal use of the cache memory by one of the processes has been detected. Thus, the use of the cache memory is not systematically degraded.

The fact of associating various values of the parameter q with various page numbers causes a change in the conversion function on each change of page. This reinforces the security of the method.

The use of the indicator $I_{2u,i}$ makes it possible to detect the abnormal use of the cache memory that occurs when a "prime+probe technique" or, in other words, spatial overload of a set, is implemented. Such a spatial overload of a set is observed in many side-channel attacks of cache memory. Thus, the use of the indicator $I_{2u,i}$ improves the security of the method.

The use of the indicator $I_{3u,i}$ makes it possible to detect an abnormal use of the cache memory referred to as "temporal overload of a set". Such a temporal overload of a set is observed in many side-channel attacks of cache memory. Thus, the use of the indicator $I_{3u,i}$ improves the security of the method.

Normally, a process need not frequently execute explicit eviction instructions. Frequent execution of this explicit eviction instruction is above all encountered when a malicious process is carrying out a side-channel attack on the cache memory. Thus, use of the indicator $I_{1u}$ also allows the security of the method to be increased.

The fact of using conversion functions that simultaneously permute at least 50% of the addresses $@_{Si,r}$ increases how difficult it is to carry out a side-channel attack on this cache memory. Specifically, the addressing of the cache memory is very different before and after the modification of the value of the parameter q. It is thus very difficult to obtain information on the operation of a process by observing the way in which it accesses the cache memory or by measuring the time taken to access the cache memory when the modification of the addressing occurs during the execution of this process. In addition, the modification of the addressing affects both hits and misses. Thus, with respect to the method described in the article by Zhenghong et al., the methods described here far more greatly increase the diversity of access to the cache memory. The methods described here are therefore more robust with respect to side-channel attacks.

The fact of in addition spontaneously modifying the value of the parameter q further increases the robustness of the process with respect to side-channel attacks of the cache memory.

The use of the counter 50 and of the line counters $C_{i,j}$ allows the second side-effect described above to be minimized without however slowing the execution of the processes substantially. It will be noted, in this regard, that to combat such a side-effect the article by Zhenghong et al. teaches to make the lines the addresses of which are changed invalid. However, this method is not transposable to the situation described here in which most of the addresses $@_{Si,r}$ are permutated at the same time on each modification of the value of the parameter q. Specifically, invalidating the lines in each of the sets $S_{i,r}$ the addresses of which are permutated would amount to removing from the cache memory a very high number of lines each time the value of the parameter q is modified. However, removing a high number of lines from the cache memory to a memory of higher rank would substantially slow the execution of the processes. Likewise, the same article indicates that another method, which is less effective, consists in moving the lines from the cache memory in order to avoid the appearance of obsolete lines. However, this other method suggested in the article by Zhenghong et al. is also not applicable to the present situation in which most of the addresses $@_{Si,r}$ are permutated at the same time. Specifically, in this case, it would be necessary to move at very high number of lines from the cache memory, and this would also greatly slow the execution of the processes.

The use of the preceding values of the parameter q to search for a word in the cache memory allows the number of cache misses following a modification of the value of the parameter q to be substantially limited. This therefore minimizes the first side-effect described above.

The fact of storing a line found in the cache memory using a preceding value of the parameter q in the location corresponding to the address $@_{Si,t}$ obtained using the most recently received value of the parameter q makes it possible to find this line more quickly if the latter is read again before the next modification of the value of the parameter q.

The invention claimed is:

1. A method for managing a cache memory of an electronic processor, said method comprising executing the following steps each time first and second processes, executed by the electronic processor, desire to read a word shared in read-only mode from the cache memory:
   a) receiving a request containing an address of the word to be read, said address comprising
      a line tag,
      a set address, said set address belonging to a first set of s different values, where the number s is an integer number higher than two,
   b) selecting, depending on an identifier of the process, a value of a parameter q, each value of the parameter q identifying a respective bijective conversion function that permutes at least 50% of the values of the first set, said selection being carried out using pre-recorded relationships that associate one value of the parameter q with each identifier of a process, then
   c) converting the received set address into a converted set address using the conversion function identified by the selected value of the parameter q, then
   d) selecting one or more line tags stored in the cache memory at the converted set address, then
   e) comparing the received line tag to the one or more selected line tags selected from the converted set address, in order to determine whether one of these selected line tags corresponds to the received line tag,
   f) when none of the selected tags corresponds to the received line tag, triggering a cache miss and delivering the word from a memory of higher rank, and when, in contrast, one of the selected line tags corresponds to the received line tag, reading from the cache memory the word from the line associated with the line tag that corresponds to the received line tag,
   at least during the first execution of steps a) to f), for the first and second processes, the pre-recorded relationships associate the identifiers of the first and second processes with the same value of the parameter q so that when the received address of the word to be read is the same for the first and second processes, then the converted set addresses used to read said word are the same,
   wherein the method in addition comprises:
      when the second process modifies the state of the cache memory, updating the value of at least one indicator specifically associated with said second process, the value of said indicator being representative of a particular modification of the state of the cache memory triggered by the second process, and
      comparing the value of said indicator to a predefined threshold and, when said predefined threshold is exceeded, detecting an abnormal use of the cache memory by the second process and, when the value of the indicator does not cross the predefined threshold, not detecting an abnormal use,
      in response to the detection of an abnormal use of the cache memory by the second process, modifying the pre-recorded relationships in order to associate, with the identifier of the second process, a value of the parameter q different from the value of the parameter q associated with the first process so that, after said modification, when the received address of the word to be read is the same for the first and second processes, then the converted set addresses used to read said word are different, and in the absence of detection of abnormal use, the pre-recorded relationships are left unchanged.

2. The method according to claim 1, wherein:

the predefined relationships associate, with each identifier of a process, a plurality of virtual memory page numbers, and each number of a virtual memory page is associated with its own value of the parameter q, said value of the parameter q associated with said page number being different from the values of the parameter q associated with the same process identifier and with the other page numbers, and in step b), the value of the parameter q is selected depending on the identifier of the process and on the number of the page of the virtual memory containing the word to be read.

3. The method according to claim 2, wherein:

the predefined relationships associate, with each number of a virtual memory page, a physical address of said page, and the method comprises obtaining the received address of the word to be read in step a) and replacing the number of the page of the virtual memory containing the word to be read with the physical address associated, via the pre-recorded relationships, with said page number and with the identifier of the process that desires to read said word.

4. The method according to claim 1, wherein the update of the at least one indicator specifically associated with the second process comprises:

each time that the second process causes a new line to be loaded into a predefined group of one or more line sets shared in read-only mode, associating said new line with the identifier of the second process, then updating the value of a first indicator depending on the number of lines of said predefined group that are associated with the identifier of said second process.

5. The method according to claim 1, wherein the update of at least one indicator specifically associated with the second process comprises, each time the second process accesses a line of a predefined group of one or more line sets shared in read-only mode, updating the value of a second indicator depending on the number of times the second process has accessed said predefined group in a predefined time interval.

6. The method according to claim 1, wherein the update of at least one indicator specifically associated with the second process comprises, each time the execution of the second process triggers the execution by the electronic processor of an explicit instruction to evict from the cache memory a line located at an address specified by the second process, updating the value of a third indicator depending on the number of times the execution of the second process triggers the execution of said explicit eviction instruction.

7. The method according to claim 1, wherein, after an abnormal use has been detected, for at least 50% of the values of the first set, the conversion function identified by the value of the parameter q associated with the second process returns a converted set address different from the converted set address that is returned by the conversion function identified by the value of the parameter q associated with the first process.

8. The method according to claim 1, wherein, independently of the detection of an abnormal use of the cache memory by the second process, the method comprises, during the execution of the first and second process, repeatedly modifying the pre-recorded relationships by replacing, in the predefined relationships, each occurrence of a given value of the parameter q with another value of the parameter q, so that, during a given execution of the first and second process, the conversion function, implemented in step c), successively associates over time, with a given set address liable to be received, a plurality of different converted set addresses.

9. The method according to claim 1, wherein:

a modification counter is incremented each time the value of the parameter q is modified, each time a new line is stored in the cache memory, the current value of the modification counter is stored in a line counter associated solely with said line, when one of the selected line tags corresponds to the received line tag, the method comprises:

comparing the value of the line counter of the line comprising said line tag to the value of the modification counter, when the value of the line counter is lower than $C_m-M$, then read-out of the word from the cache memory is inhibited and a cache miss is triggered, and in contrast, when the value of the line counter is higher than or equal to $C_m-M$, then the cache miss is not triggered and the read-out of the word from the cache memory continues, where:

$C_m$ is the value of the modification counter at the moment at which the value of the line counter is compared to the value of the modification counter, and M is an integer number comprised between 1 and 50.

10. The method according to claim 9, wherein the method comprises:

marking all of the lines of the cache memory as being invalid in response to the modification counter crossing a predefined threshold, and inhibiting the use of each line marked as being invalid until it has been replaced by a new line loaded from the memory of higher rank.

11. The method according to claim 1, wherein:

on each modification of the value of the parameter q, the preceding value of the parameter q is stored in a queue containing the R preceding values of the parameter q, where R is an integer number comprised between 1 and 50, when none of the selected line tags corresponds to the received line tag and before a cache miss is triggered and before the word is delivered from the memory of higher rank, one of the preceding values of the parameter q is selected from the queue and steps b) to f) are executed again using the preceding value selected for the parameter q instead of the current value of said parameter q.

12. The method according to claim 11, wherein, when a line tag corresponding to the received line tag is found in the cache memory using one of the preceding values of the parameter q, the method comprises replacing one of the lines of the set located at the converted set address obtained using the received value of the parameter q with the line associated with said line tag corresponding to the received line tag found in the cache memory using one of the preceding values of the parameter q.

13. The method according to claim 11, wherein the number R is comprised between 4 and 16.

14. The method according to claim 9, wherein the number M is equal to the number R.

15. Unit A unit for managing a cache memory of an electronic processor, said unit being configured to carry out the following steps each time first and second processes, executed by the electronic processor, desire to read a word shared in read-only mode from the cache memory:
- a) receiving a request containing an address of the word to be read, said address comprising
  a line tag,
  a set address, said set address belonging to a first set of s different values,
  where the number s is an integer number higher than two,
- b) identifying a conversion function depending on a value of a parameter q, which value is selected depending on an identifier of the process, each value of the parameter q identifying a respective bijective conversion function that permutes at least 50% of the values of the first set, the selection of the value of the parameter q having previously been carried out using pre-recorded relationships that associate one value of the parameter q with each identifier of a process, then
- c) converting the received set address into a converted set address using the conversion function identified by the value of the parameter q, then
- d) selecting one or more line tags stored in the cache memory at the converted set address, then
- e) comparing the received line tag to the one or more selected line tags selected from the converted set address, in order to determine whether one of these selected line tags corresponds to the received line tag,
- f) when none of the selected tags corresponds to the received line tag, triggering a cache miss and delivering the word from a memory of higher rank, and when, in contrast, one of the selected line tags corresponds to the received line tag, reading from the cache memory the word from the line associated with the line tag that corresponds to the received line tag, at least during the first execution of steps a) to f), for the first and second processes, the pre-recorded relationships associate the identifiers of the first and second processes with the same value of the parameter q so that when the received address of the word to be read is the same for the first and second processes, then the received values of the parameter q are the same and the converted set addresses used to read said word are the same, wherein the managing unit is also configured to carry out the following steps:

when the second process modifies the state of the cache memory, updating the value of at least one indicator specifically associated with said second process, the value of said indicator being representative of a particular modification of the state of the cache memory triggered by the second process, and comparing the value of said indicator to a predefined threshold and, when this predefined threshold is exceeded, detecting an abnormal use of the cache memory by the second process and, when the value of the indicator does not cross the predefined threshold, not detecting an abnormal use, in response to the detection of an abnormal use of the cache memory by the second process, the managing unit triggers the modification of the pre-recorded relationships in order to associate, with the identifier of the second process, a value of the parameter q different from the value of the parameter q associated with the first process so that, after this modification, when the received address of the word to be read is the same for the first and second processes, then the converted set addresses used to read this word are different, and in the absence of detection of abnormal use, the managing unit does not trigger the modification of the pre-recorded relationships and the latter are left unchanged.

* * * * *

UNITED STATES PATENT AND TRADEMARK OFFICE
CERTIFICATE OF CORRECTION

PATENT NO. : 11,003,593 B2  
APPLICATION NO. : 16/744268  
DATED : May 11, 2021  
INVENTOR(S) : Hiscock et al.

It is certified that error appears in the above-identified patent and that said Letters Patent is hereby corrected as shown below:

In the Claims

In Column 25, Claim 4, Line 30, delete "the".

In Column 27, Claim 15, Line 1, delete "Unit".

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*